United States Patent [19]

Krambrock et al.

[11] Patent Number: 5,704,990
[45] Date of Patent: Jan. 6, 1998

[54] METHOD OF BLOWING CONVEYING CONDUITS FREE OF MATERIAL AFTER CONVEYANCE

[75] Inventors: Wolfgang Krambrock, Vogt; Harald Wilms, Tettnang, both of Germany

[73] Assignee: Zeppelin Schuettguttechnik GmbH, Weingarten, Germany

[21] Appl. No.: 340,852

[22] Filed: Nov. 15, 1994

[30] Foreign Application Priority Data

Nov. 15, 1993 [DE] Germany ............ 43 38 965.1

[51] Int. Cl.⁶ .................. B08B 5/00; B08B 5/02; B08B 9/00; B08B 9/093
[52] U.S. Cl. ................... 134/22.12; 134/22.18; 134/37
[58] Field of Search ............ 134/22.12, 22.18, 134/37

[56] References Cited

U.S. PATENT DOCUMENTS

| | | | |
|---|---|---|---|
| 4,063,317 | 12/1977 | Santore | 4/255 |
| 4,145,453 | 3/1979 | Lenhardt, Sr. | 426/516 |
| 4,893,966 | 1/1990 | Roehl | 406/127 |
| 4,969,942 | 11/1990 | Schwenninger et al. | 65/27 |
| 5,184,730 | 2/1993 | Paul | 209/142 |
| 5,403,381 | 4/1995 | Areaux | 75/708 |

FOREIGN PATENT DOCUMENTS

| | | |
|---|---|---|
| U-71 29 735 | 11/1971 | Germany. |
| B-23 34 360 | 1/1975 | Germany. |
| 2630368 | 6/1977 | Germany. |
| 3820710 | 12/1989 | Germany. |
| 288580 | 4/1991 | Germany. |
| 436120 | 5/1967 | Switzerland. |
| A-436 120 | 11/1967 | Switzerland. |

*Primary Examiner*—Zeinab El-Arini
*Attorney, Agent, or Firm*—Spencer & Frank

[57] ABSTRACT

A method of advancing material through a conveying conduit and blowing the conveying conduit free of material after conclusion of material conveyance includes the following steps: passing a conveying gas through a conveying conduit with a first flow rate for transporting the material therein; after conclusion of the conveying step, passing the conveying gas through a first gas inlet of an injector; drawing additional gas into the injector through a second inlet thereof by the conveying gas entering the injector through the first inlet; and passing a mixture of the conveying gas and the additional gas with a second flow rate, which is greater that the first flow rate, from the outlet of the injector through the conveying conduit for blowing the conveying conduit free of material.

7 Claims, 3 Drawing Sheets

METHOD OF BLOWING CONVEYING CONDUITS FREE OF MATERIAL AFTER CONVEYANCE

BACKGROUND OF THE INVENTION

The invention relates to a method of blowing a conveying conduit free of material after conclusion of material conveyance therein.

In many sectors of process engineering, particularly in the pneumatic conveyance of bulk materials, there is a need, after the conclusion of the conveying operation and in the event of a change of product, to clean the conveying conduit of residues, that is, residual products or dust. This is usually achieved by expelling such material with a gas stream, hereafter referred to as blowing the conduit free or blowing free. A relatively high gas velocity and therefore a relatively large quantity of gas are required for blowing free. However, since only small quantities are located in the conveying conduit, only a very much lower pressure is needed for blowing free. Particularly when the conduit is almost completely clean at the end of the cleaning cycle, this lower pressure is determined essentially by the resistance of the conduit when a pure gas flow passes through it. This relatively large quantity of gas at lower pressure often cannot be provided by the compressor or is not to be taken directly from a compressed-air system.

A further blower, designed for the larger quantity of gas and the lower pressure, is conventionally employed for this purpose. This blower is used solely for blowing the conduit free and thus constitutes additional investment for the blower unit, the associated control and the operating and maintenance costs.

SUMMARY OF THE INVENTION

The object on which the invention is based is, therefore, to propose a method for the blowing free of conveying conduits, in which there is no longer any need for an additional blower for blowing the conduit free. At the same time, damage caused when the conduit is being blown free is to be avoided.

This object and others to become apparent as the specification progresses, are accomplished by the invention, according to which, briefly stated, the method of advancing material through a conveying conduit and blowing the conveying conduit free of material after conclusion of material conveyance includes the following steps: passing a conveying gas through a conveying conduit with a first flow rate for transporting the material therein; after conclusion of the conveying step, passing the conveying gas through a first gas inlet of an injector; drawing additional gas into the injector through a second inlet thereof by the conveying gas entering the injector through the first inlet; and passing a mixture of the conveying gas and the additional gas with a second flow rate, which is greater that the first flow rate, from the outlet of the injector through the conveying conduit for blowing the conveying conduit free of material.

Accordingly, in a method according to the invention, the higher pressure of the compressor, which is available as a conveying pressure during the conveyance of bulk materials, is used as a driving pressure for sucking up additional gas, for example air, via an injector during blowing free. The gas-volume flow available for blowing free thereby becomes larger than the compressed-air flow generated by the compressor. The pressure is simultaneously reduced, so that the necessary conditions for the blowing-free operation are afforded.

The apparatus for carrying out this method includes an air-quantity regulating unit, especially with one or more Laval nozzles, which are connected in parallel with the injector. Moreover, suitable shut-off members are provided, so that the compressed air flows either via the one or the plurality of Laval nozzles or via the injector, so that, where the flow via the injector is concerned, an additional quantity of air-flow is sucked up from the ambient air or from a gas reservoir in order to increase the air-volume.

By means of an arrangement of this type, the size of the air-volume flow can be regulated via the shut-off members, so that the air volume stream and the size of the air pressure can be set both for the conveyance of the bulk materials and for the blowing free of the compressor.

If a compressed-air system is present, in a method according to the invention and in an apparatus for carrying out this method the compressed air can be taken from the compressed-air system instead of from the compressor.

Instead of compressed air, another gas from a corresponding gas reservoir, especially nitrogen or carbon dioxide, can also be used. This is advantageous especially when air and bulk material produce a reactive mixture, for example in the case of combustible or explosive material, or when a protective gas is used in order to prevent the transfer of moisture or product variations.

In a particular embodiment, a compressed-air system used in the implementation of the invention can also be fed from a plurality of compressors which together generate sufficient compressed air for conveyance, but not for the simultaneous blowing free of the conduit. Without an injector according to the invention, even if a plurality of compressors in a compressed-air system were used, at least one additional blower for blowing free would be necessary in order to increase the gas-volume flow correspondingly.

Advantageously, the conveying pressure of the compressed air for the pneumatic conveyance of bulk materials is above 1.5 bar, the velocity of the gas-volume flow during blowing free being between 15 and 35 m/sec. In further versions, however, conveying pressures and velocities outside the said ranges are also possible without further action.

Should a plurality of conveying systems be present, it is recommended to combine the Laval nozzle and injector stations to form a module-like unit.

At the same time, the supply of air or gas to the various injectors can take place via a common conduit having a common suction filter.

An exemplary embodiment of the invention is illustrated in the drawing and is explained in more detail by means of the following description.

DESCRIPTION OF THE PREFERRED EMBODIMENTS

Figure 1:
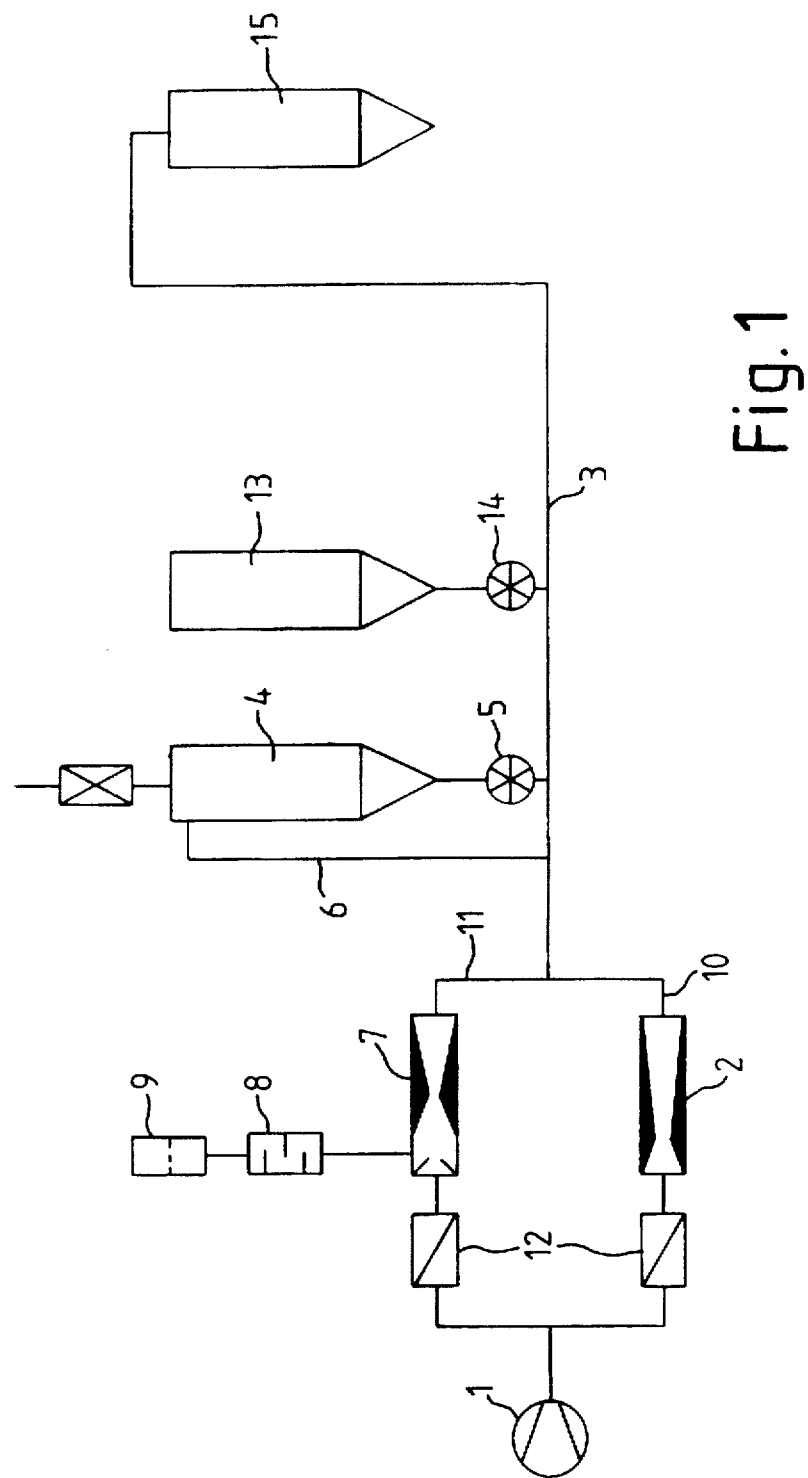
FIG. 1 shows a circuit diagram of an apparatus according to the invention for the blowing free of conveying conduits.

FIG. 1 shows a compressor 1 which is connected to a pneumatic conveying conduit 3 via a Laval nozzle 2. Bulk materials which are stored in a silo 4 are conveyed in the conveying conduit 3. The silo 4 is connected to the conveying conduit 3 via a metering member 5. If the silo 4 is connected to the outside air, that is to say to normal atmospheric pressure, it is recommended to design the metering member 5 as a cellular-wheel sluice. It is also possible, however, to load the silo 4 with the conveying pressure of the conveying conduit 3 via a connecting conduit 6. In this case, a conventional shut-off member can also be used as a metering member 5 instead of a cellular-wheel sluice. Between the compressor 1 and the conveying conduit 3, an injector 7 is connected in parallel with the Laval nozzle 2 functioning as an air-quantity regulator. This injector 7 is connected to the outside air or to a corresponding gas tank via a muffler 8 and a suction filter 9.

Thus, the injector 7 has a first gas inlet for receiving gas from the compressor 1 and a second gas inlet through which additional gas is drawn by the compressor-generated gas flow if the latter is caused to pass through the injector 7 as will be described below.

The injector 7 and the Laval nozzle 2 are connected to the conveying conduit 3 via conduits 10, 11 guided in parallel. The injector 7 and the Laval nozzle 2 are each preceded by a shut-off flap 12.

In the present exemplary embodiment, in addition to the silo 4, a further silo 13 is coupled by means of an additional cellular-wheel sluice 14 to the conveying conduit 3, at the end of which a receiving container 15 is located.

During pneumatic conveyance, especially dense-flow or slow conveyance, a gas-volume flow and conveying pressure dependent on the conduit routing and length and on the product-quantity flow and the product are required for conveyance. In an apparatus according to FIG. 1, this gas-volume flow is supplied directly by the compressor 1. A regulation of the gas quantity subsequently takes place via the Laval nozzle 2. By means of the gas volume flow thus made available, a specific bulk-material quantity flow is conveyed through the pneumatic conveying conduit 3 out of the silo 4 into the receiving container 15. The feed of the bulk materials into the conveying conduit 3 out of the silo 4 is brought about in this case via a corresponding metering member 5. Depending on whether the silo 4 is loaded with the conveying pressure via the connecting conduit 6 or not, the metering member 5 constitutes a cellular-wheel sluice or a conventional shut-off member.

After the conclusion of the conveying operation, the conveying conduit 3 has to be cleaned of residues of bulk material and of dust.

As stated above, a larger gas quantity at lower pressure, which cannot be provided directly by the compressor 1, is required here.

The higher pressure of the compressor 1 is therefore utilized in order, via the injector 7 which sucks up gas via the muffler 8 and the suction filter 9, to increase the gas-volume flow without a further blower for blowing the conveying conduit free. So that the full pressure and gas-volume flow of the compressor 1 can be utilized as a driving pressure for the injector, the gas-volume flow flowing via the conduit part 10 during conveyance is also guided via the injector 7 and the conduit 11 guided in parallel, for which purpose the shut-off flaps 12 are closed and opened in a corresponding way.

After the conclusion of the cleaning operation, the shut-off flaps 12 are switched into their initial position again, so that a new conveying operation, for example with a further product out of the additional silo 13 via the additional cellular-wheel sluice 14, can be carried out.

Figure 2:
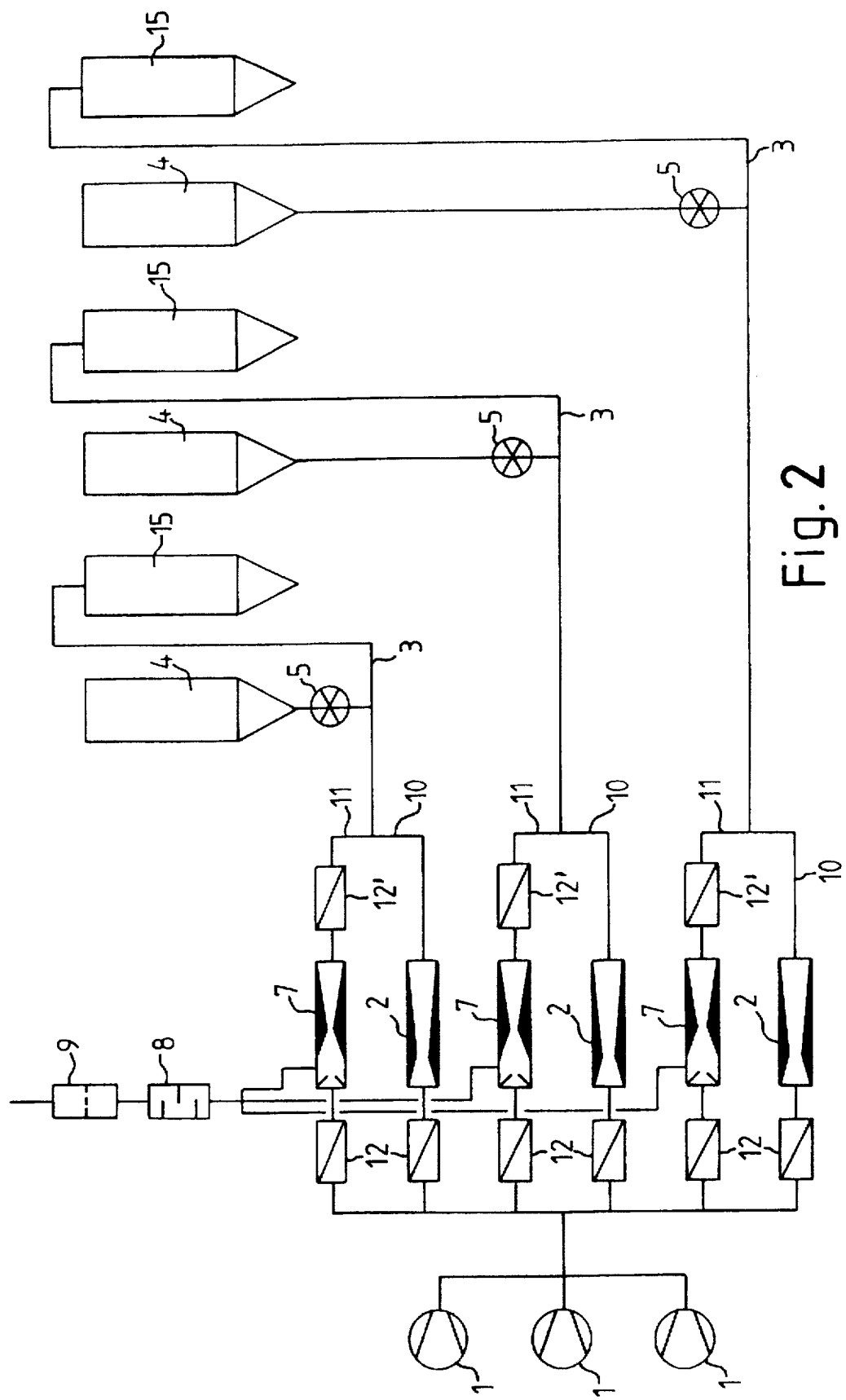
FIG. 2 shows a circuit diagram of an apparatus of this type with a plurality of compressors and conveying conduits.

In the arrangement according to FIG. 2, three compressors 1 are provided, which, in this case, supply compressed air to altogether six different conduits 10, 11 which are branched off in parallel and which open into three different conveying conduits 3. At the same time, three conduits 10 of the six conduits mentioned are guided via Laval nozzles 2 as a quantity-regulating element for the gas flow during the conveyance of bulk material out of a silo 4 in each case. An injector 7 is provided in each of the three conduits 11 in order to clean the various conveying conduits 3 which each open into their own receiving container 15. The suction conduits of the injectors 7 are brought together and open jointly into the muffler 8 which is itself preceded by a suction filter 9.

In contrast to the first-mentioned exemplary embodiment, further shut-off flaps 12' are provided downstream of the injectors 7 in the direction of flow. These serve for also uncoupling the various conveying-conduit lines from one another when bulk materials are being conveyed in one conveying conduit, but in another are being blown out. Without these additional shut-off flaps 12', when one conveying conduit 3 is being blown out a corresponding gas flow could be supplied to the second conveying conduit, which is just conveying bulk material, via the connection of the two injectors 7 through the common suction conduit to the muffler 8. This would, of course, be undesirable and can be prevented by the additional shut-off flap 12'.

The arrangement illustrated is operated in the way mentioned above in relation to FIG. 1, three different conveying conduits now conveying bulk material out of three different silos into three different receiving containers 15.

Figure 3:
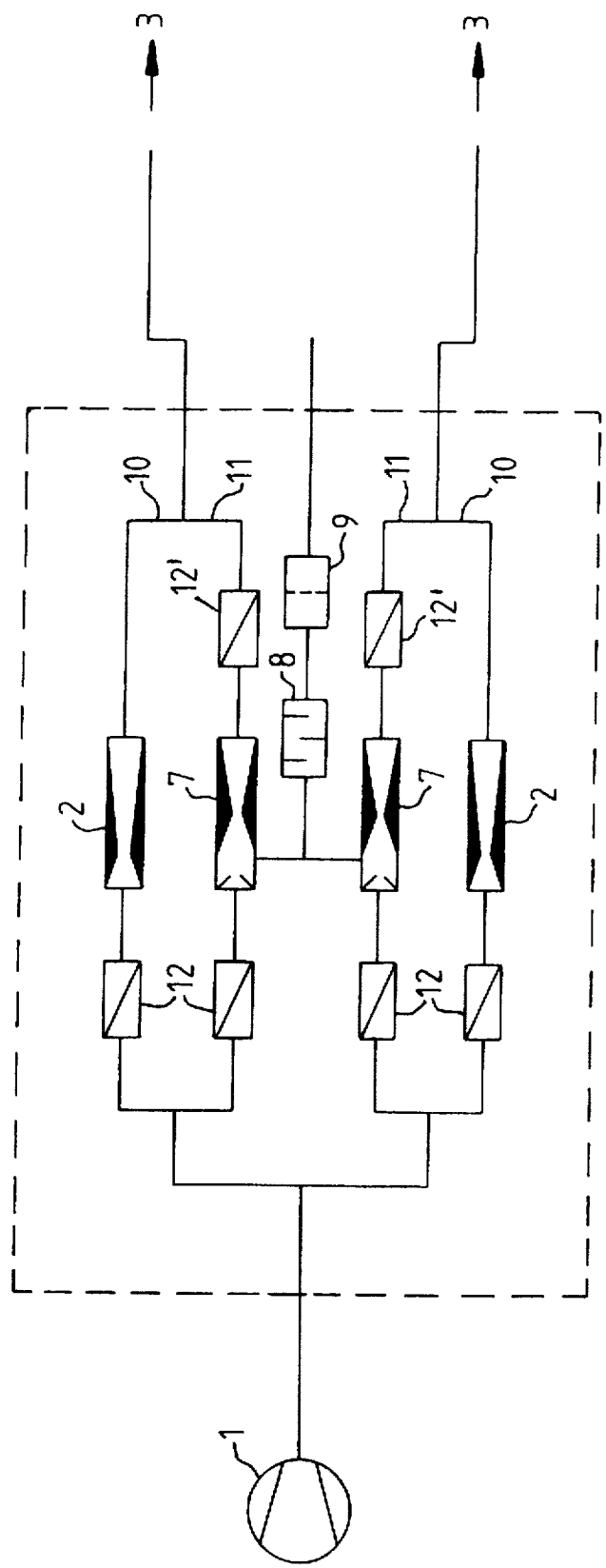
FIG. 3 shows a circuit diagram of an apparatus having injector stations combined in a module-like manner.

In FIG. 3, a module-like construction of an apparatus according to the invention is indicated by a rectangle with broken lines. A compressed-gas conduit from the compressor 1 and a suction conduit to the suction filter 9 are provided as an inlet. Two conveying conduits 3 form the outlet of the module-like unit. The compressed-gas flow from the compressor 1 is distributed, within the module, to two parallel circuits which each consist of one branch 10 with a Laval nozzle 2 and of a further branch 11 with an injector 7. The suction conduits of the injectors 7 open again, via a collecting conduit, into a common muffler and a common suction filter.

As in the exemplary embodiment according to FIG. 2, in contrast to the first-mentioned exemplary embodiment, further shut-off flaps 12' for the complete uncoupling of the two conveying-conduit lines are provided downstream of the injectors 7 in the direction of flow.

We claim:

1. A method of advancing material through a conveying conduit and blowing the conveying conduit free of material after conclusion of material conveyance, comprising the following steps:

(a) providing an injector having a first gas inlet, a second gas inlet and a gas outlet;

(b) passing a conveying gas through a conveying conduit with a first flow rate for transporting the material therein;

(c) after conclusion of step (b), passing the conveying gas through the first gas inlet of the injector;

(d) drawing additional gas into the injector through the second inlet by the conveying gas entering the injector through the first inlet; and (e) passing a mixture of the conveying gas and the additional gas with a second flow rate from the outlet of the injector through the conveying conduit for blowing the conveying conduit free of material; the second flow rate being greater than the first flow rate.

2. The method as claimed in claim 1, wherein the conveying gas is one of compressed air, nitrogen and carbon dioxide.

3. The method as claimed in claim 2, wherein the pressure of the conveying gas is greater than 1.5 bar and the velocity of the gas mixture flowing through said outlet in step (e) is between 15 and 35 m/s.

4. The method as claimed in claim 2, wherein step (d) comprises the step of drawing the additional gas from the environment.

5. The method as claimed in claim 2, wherein step (d) comprises the step of drawing the additional gas from a gas reservoir.

6. The method as claimed in claim 1, further comprising the step of generating the conveying gas by a compressor.

7. The method as claimed in claim 1, further comprising the step of generating the conveying gas by a plurality of compressors.

* * * * *